(12) United States Patent
Warnke

(10) Patent No.: US 6,335,581 B1
(45) Date of Patent: Jan. 1, 2002

(54) ELECTRIC MOTOR INTENDED FOR USE IN AN AGGRESSIVE MEDIUM

(75) Inventor: Wolfgang Warnke, Herleshausen (DE)

(73) Assignee: Mannesmann Vdo AG (DE)

( * ) Notice: Subject to any disclaimer, the term of this patent is extended or adjusted under 35 U.S.C. 154(b) by 0 days.

(21) Appl. No.: 09/550,233

(22) Filed: Apr. 14, 2000

(30) Foreign Application Priority Data

May 20, 1999 (DE) .......................... 199 23 201

(51) Int. Cl.$^7$ ................................ H02K 1/00
(52) U.S. Cl. ................................ 310/89; 310/85
(58) Field of Search ................ 310/89, 261, 195, 310/196; 417/410.4, 420

(56) References Cited

U.S. PATENT DOCUMENTS

| | | | | |
|---|---|---|---|---|
| 3,718,830 A | * | 2/1973 | Philofsky et al. | 310/64 |
| 4,120,618 A | * | 10/1978 | Klaus | 417/420 |
| 5,779,453 A | * | 7/1998 | Nagayama et al. | 417/410.4 |
| 5,816,782 A | * | 10/1998 | Nagayama et al. | 417/410.4 |

FOREIGN PATENT DOCUMENTS

DE 1089468 2/1959

* cited by examiner

Primary Examiner—Tran Nguyen
(74) Attorney, Agent, or Firm—David M. Thimmig; Mayer, Brown & Platt

(57) ABSTRACT

In an electric motor, through which fuel flows, an armature core bundle of a rotor has a hose-like casing. This hose-like casing is manufactured from a fuel-resistant material and protects the armature core bundle against corrosion. An unbalance in the rotor due to the hose shape of the casing is kept particularly low.

12 Claims, 1 Drawing Sheet

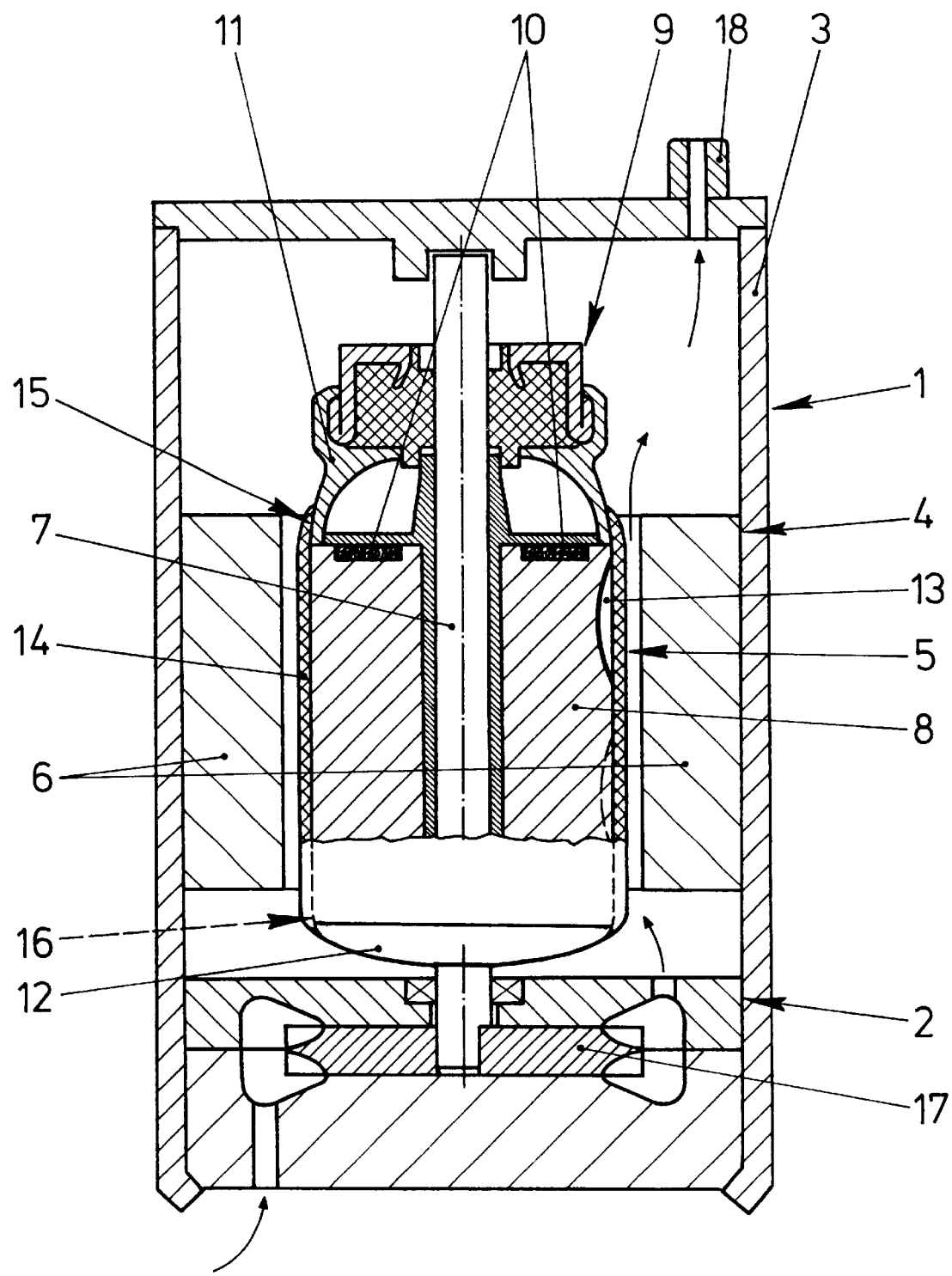

ELECTRIC MOTOR INTENDED FOR USE IN AN AGGRESSIVE MEDIUM

BACKGROUND OF THE INVENTION

The invention relates to an electric motor intended for use in an aggressive medium and, in particular, for a fuel pump of a motor vehicle, with a rotor rotating within a stator, the rotor having an outer surface susceptible to corrosion in respect of the intended medium.

Such electric motors are often used for driving fuel pumps and are known in practice. In this case, the fuel flows through the electric motor. The electric motor therefore does not require complicated sealing, so that it can be produced highly cost-effectively. The rotor usually has an armature core bundle composed of a soft-magnetic steel which is therefore highly susceptible to corrosion. In particular, alcohol-, water- or acid-containing fuels therefore result in the rotor being destroyed.

It would be conceivable to injection-mold corrosion-resistant plastic or wrap foil around the rotor completely. However, this increases the distance between the rotor and the stator, so that the efficiency of the electric motor decreases. Furthermore, injection-molding around the rotor leads to a pronounced unbalance. Wrapping necessarily has overlaps which likewise result in an unbalance. Since, due to the high density of the armature core bundle, the rotor has to be balanced, for example by milling out, before being injection-molded around it or being wrapped with foil, the injected-around or wrapped armature requires a second balancing. This leads to a particularly cost-intensive manufacture of the rotor.

It would also be conceivable for the rotor to be covered with a corrosion-resistant lacquer. However, such lacquers require high curing temperatures. The high temperatures may, however, destroy components of the rotor.

SUMMARY OF THE INVENTION

The problem on which the invention is based is to design an electric motor of the type initially mentioned, in such a way that it can be produced particularly cost-effectively and affords a high degree of protection for media which are aggressive toward components of the rotor.

This problem is solved, according to the invention, in that the rotor has a hose-like casing resistant to the intended medium.

By virtue of this design, there is no need for high temperatures in order to protect the rotor against corrosion, so that damage to the rotor is ruled out by the attachment of the hose-like casing. Since the casing, because of its hose shape, can be provided with the same thickness at every point, the true-turned and balanced rotor is not unbalanced as a result of the attachment of the hose-like casing. A suitable choice of material for the hose-like casing gives the outer surface of the rotor particularly reliable corrosion protection. Since curing or stoving of the corrosion protection is not necessary, in contrast to lacquer or to injection-molding around, the electric motor according to the invention becomes particularly cost-effective.

According to an advantageous development of the invention, the unbalance caused by the hose-like casing can be kept particularly low if the hose-like casing is seamless.

According to another advantageous development of the invention, the mounting of the hose-like casing becomes particularly simple if the hose-like casing is designed elastically. Furthermore, the hose-like casing is thereby connected reliably to the rotor. It is therefore possible to avoid the situation where the hose-like casing is stuck fast.

According to another advantageous development of the invention, particularly high prestressing forces of the hose-like casing can be applied in a simple way if the hose-like casing is designed as a shrinkable hose which contracts plastically as a result of heating. Another advantage of this design is that the shrinkable hose can be fixed to the end faces of the rotor by means of a slight projection beyond the outer surface. The hose-like casing is consequently fastened to the rotor particularly reliably. Moreover, another advantage of this design arises when the hose-like casing is mounted on the rotor, since, by virtue of the invention, the casing does not have to be stretched at the same time.

A contribution to further reducing the manufacturing costs for the electric motor according to the invention is made if the hose-like casing contains polyester, Polyvinyl Chloride (PVC) or Polytetrafluoro Ethylene (PTFE).

The edges of the hose-like casing which are contiguous with the rotor could, for example, be adhesively bonded to the rotor for sealing purposes. Alternatively, a clamping ring could also be fastened on the rotor for sealing off the hose-like casing. This results, however, in an increase in the costs of the electric motor and also in an unbalance being introduced into the rotor. However, according to another advantageous development of the invention, it becomes particularly simple to seal off the hose-like casing if the rotor has a smooth continuous annular surface in each of the contiguous regions of its outer surface and if the hose-like casing is prestressed against the annular surfaces.

BRIEF DESCRIPTION OF THE DRAWING

The invention permits numerous embodiments. In order to make its basic principle even clearer, one of these is illustrated in the drawing and described below. The single FIGURE of this drawing shows diagrammatically an electric motor according to the invention with a feed pump.

DETAILED DESCRIPTION OF THE PREFERRED EMBODIMENT

The drawing shows an electric motor 1 with a feed pump 2. The electric motor 1 has a stator 4 fastened in a housing 3 and a rotor 5 mounted rotatably in said stator. Magnetic shells 6 of the stator 4 are fastened to the housing 3. These magnetic shells 6 are opposite to and at a slight distance from an armature core bundle 8 of the rotor 5, said bundle being arranged fixedly in terms of rotation on a shaft 7. The rotor 5 has a coil 10 supplied with electric current via an armature 9. The design of the rotor 5 is illustrated in part section in order to make it clearer.

Plastic 11, 12 is injection-molded around the end faces of the rotor 5. Furthermore, recesses 13, obtained during balancing as a result of cutting away, are present in the armature core bundle 8. The outer surface of the rotor 5 and therefore that region of the armature core bundle 8 around which the plastic 11, 12 is not injection-molded have a hose-like casing 14. In the preferred embodiment, the hose-like casing 14 is formed by a PVC shrinkable hose contracting under heating and having a wall thickness of 0.85 mm and is therefore prestressed, without a gap, against the armature core bundle 8. One skilled in the art will appreciate that it is preferrable to make the hose-like casing of material containing polyester, PVC or PTFE, and with a wall thickness of approximately 0.2 mm to 1 mm. The regions of the plastic 11, 12 which are contiguous with the armature core bundle 8 are true turned cleanly and therefore each have a smooth continuous annular surface 15, 16. The hose-like casing 14 rests sealingly against this annular surface 15, 16.

An impeller 17 of the feed pump 2 is arranged fixedly in terms of rotation on the shaft 7. The feed pump 2 may be, for example, a fuel pump of a motor vehicle. The medium fed by the feed pump 2 is sucked in from outside the housing 3 and is fed through between the stator 4 and rotor 5 of the electric motor 1 to a connection piece 18. For the sake of clarity, the flows of the medium are depicted by arrows. The hose-like casing 14 protects the armature core bundle 8 manufactured from soft iron against chemical influences exerted by the medium to be fed.

We claim:

1. An electric motor intended for use in fuel, said motor having a rotor rotating within a stator, the rotor having an outer surface susceptible to corrosion in respect to the fuel, wherein the rotor has a seamless hose-like casing having a constant wall thickness in the range of approximately 0.2 to 1 millimeters, said casing being resistant to the fuel.

2. The electric motor as claimed in claim 1, wherein the hose-like casing is designed elastically.

3. The electric motor as claimed in claim 1, wherein the hose-like casing is adapted to contract plastically for assembly as a result of heating.

4. The electric motor as claimed in claim 1, wherein the hose-like casing contains polyester, polyvinyl chloride or polytetrafluoro ethylene.

5. The electric motor as claimed in claim 4, wherein the hose-like casing has a wall thickness of approximately 0.85 millimeters.

6. The electric motor as claimed in claim 1, wherein the rotor has an outer surface and a smooth continuous annular surface in contiguous regions of the outer surface of the rotor, and wherein the hose-like casing is prestressed against the annular surfaces.

7. An electric motor having a rotor, said rotor rotates within a stator, the rotor further having a seamless hose-like casing having a constant wall thickness in the range of approximately 0.2 to 1 millimeters to protect against corrosion of the rotor.

8. The electric motor as claimed in claim 7, wherein the hose-like casing is designed elastically.

9. The electric motor as claimed in claim 7, wherein the hose-like casing is adapted to contract plastically for assembly as a result of heating.

10. The electric motor as claimed in claim 7, wherein the hose-like casing contains polyester, polyvinyl chloride or polytetrafluoro ethylene.

11. The electric motor as claimed in claim 10, wherein the hose-like casing has a wall thickness of approximately 0.85 mm.

12. The electric motor as claimed in claim 7, wherein the rotor has an outer surface and a smooth continuous annular surface in contiguous regions of the outer surface of the rotor, and wherein the hose-like casing is prestressed against the annular surfaces.

* * * * *